(12) United States Patent
Randall

(10) Patent No.: US 6,611,256 B1
(45) Date of Patent: *Aug. 26, 2003

(54) TOUCH SCREEN DIELECTRIC SEPARATORS

(75) Inventor: Mary L. Randall, Buffalo, MN (US)

(73) Assignee: The Bergquist Company, Chanhassen, MN (US)

( * ) Notice: Subject to any disclaimer, the term of this patent is extended or adjusted under 35 U.S.C. 154(b) by 37 days.

This patent is subject to a terminal disclaimer.

(21) Appl. No.: 09/971,256

(22) Filed: Oct. 4, 2001

Related U.S. Application Data

(62) Division of application No. 09/595,651, filed on Jun. 16, 2000, now Pat. No. 6,424,339.

(51) Int. Cl.⁷ .................................. G09G 5/00
(52) U.S. Cl. ................. 345/173; 178/18.01; 178/18.03; 178/18.05; 338/114; 338/115; 427/66; 427/164
(58) Field of Search ................. 345/173–177; 178/18.01–18.09; 338/114, 115; 427/66, 164; 430/311, 313; 438/384, 780; 200/511, 512

(56) References Cited

U.S. PATENT DOCUMENTS

| | | | |
|---|---|---|---|
| 4,484,179 A | | 11/1984 | Kasday |
| 5,510,812 A | * | 4/1996 | O'Mara et al. ............. 345/156 |
| 5,736,688 A | | 4/1998 | Barrett et al. |
| 5,852,487 A | * | 12/1998 | Fujimori et al. ............ 345/104 |
| 5,898,426 A | * | 4/1999 | Kim ............................ 345/173 |
| 6,034,860 A | * | 3/2000 | Shea ........................... 200/279 |
| 6,072,130 A | * | 6/2000 | Burgess ..................... 200/86 R |
| 6,114,645 A | * | 9/2000 | Burgess ..................... 200/512 |
| 6,121,869 A | * | 9/2000 | Burgess ..................... 200/511 |
| 6,307,166 B1 | * | 10/2001 | Watanabe et al. ........ 178/18.03 |
| 6,329,617 B1 | * | 12/2001 | Burgess ..................... 200/512 |
| 6,380,497 B1 | * | 4/2002 | Hashimoto et al. ......... 200/5 A |
| 6,405,648 B1 | * | 6/2002 | Kinoshita ................... 200/264 |
| 6,424,094 B1 | * | 7/2002 | Feldman .................... 315/169.3 |
| 6,424,339 B1 | * | 7/2002 | Randall .................. 178/18.01 |
| 2001/0037738 A1 | * | 11/2001 | Kinoshita ................... 101/170 |

* cited by examiner

Primary Examiner—Henry N. Tran
(74) Attorney, Agent, or Firm—Haugen Law Firm PLLP

(57) ABSTRACT

A touch screen assembly for contact input systems, with the touch screen including a base substrate with an electrically resistive coating thereon. An array of reticulated spaced raised projections are formed on the inner surface, with the raised projections consisting of a developed/cured photoresist. In its formation, the photoresist is applied as an adherent layer with a release-film backing, with the layer being applied onto a heated substrate. Thereafter, a laminate is formed by passing the photoresist layer beneath a heated pneumatically actuated nip roll to cause the photoresist layer to flow, thereby forming a layer of uniform thickness. Thereafter, the laminate is masked, exposed to incident radiation, and developed so as to provide a reticulated pattern of adherent raised projections. A flexible plastic film having a resistive coating thereon is thereafter mounted on the substrate in superimposed relationship to the raised projections.

2 Claims, 2 Drawing Sheets

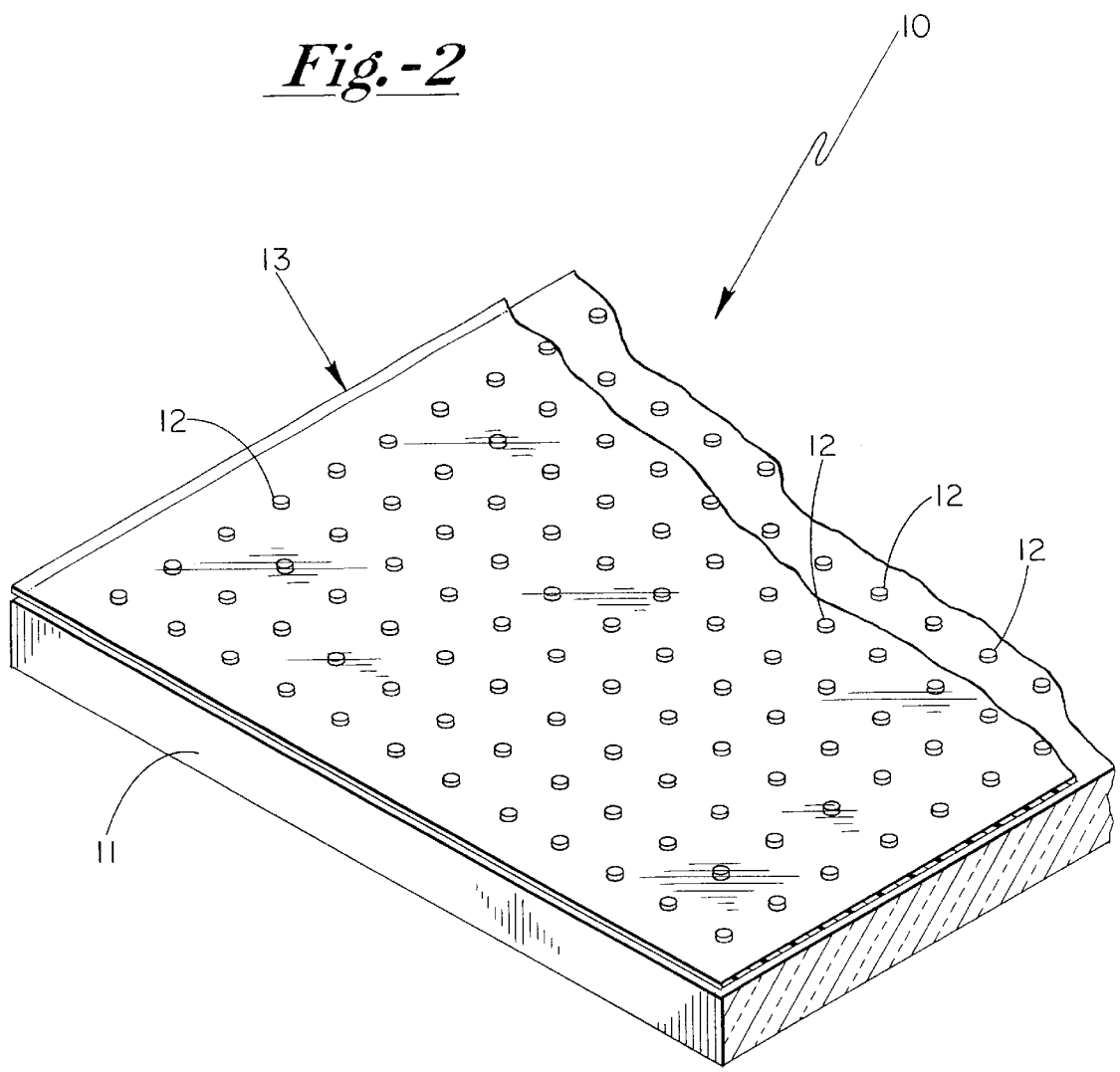

TOUCH SCREEN DIELECTRIC SEPARATORS

Figure 1:
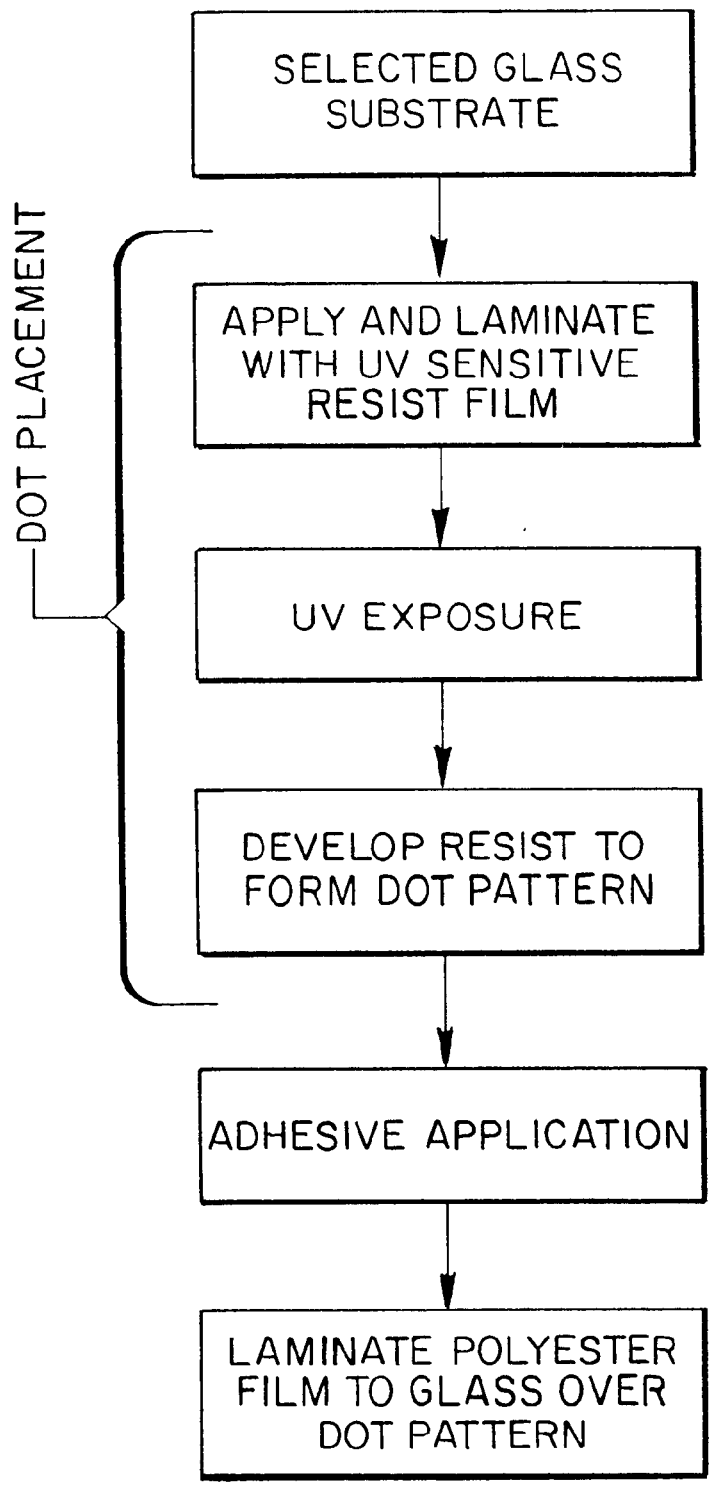

The present application is a divisional of my application Ser. No. 09/595,651, filed Jun. 16, 2000, entitled "TOUCH SCREEN ASSEMBLY", now U.S. Pat. No. 6,424,339.

BACKGROUND OF THE INVENTION

The present invention relates generally to an improved touch screen or touch panel assembly for a contact input system, and more particularly, to a touch screen having a uniform pattern of reticulated, non-hemispherical, spaced and uniformly raised projections disposed thereon for maintaining appropriate separation between opposed electrically resistive coatings present on the inner surfaces of the substrate and its coverlay assembly. In accordance with the steps involved in forming the raised projections (separators), the raised projections created in the process are not only highly adherent and coherent with good durability, but are also formed in a uniformly spaced reticulated pattern, and raised to a uniform height so as to provide uniform spacing between the substrate and flexible coverlay. Accordingly, the present invention improves the lifetime and performance of contact input systems by improving the mechanical, electrical and optical properties of the screen while reducing the reflectivity of the substrate surface as well. The touch screens of the present invention have improved performance due to the features of the steps involved in the process of creating the projections which are formed of a discrete, uniform, and reliable height and spacing and also are highly adherent to the substrate surface. Thus, the gap created and maintained between the opposed electrically resistive coatings is reliably constant due to the rugged nature of the projections.

Contact input systems have been in use for a wide variety of applications, including in particular, computer graphics, computer-aided design and manufacturing systems, as well as for a variety of other applications including control panels for moderately and highly complex process machinery, scientific instruments, and the like. Because of the highly desirable optical properties of touch screen systems fabricated pursuant to the present invention, other applications including those requiring uniform optical clarity and low reflectivity are made possible, including, for example, signature recognition, palm recognition/rejection, and the like.

These screens typically employ a base or substrate with the inner surface having a coating thereon of uniform resistivity. The screens typically employ a transparent flexible coverlay film with the inner surface having a coating thereon of uniform electrical conductivity/resistivity. These touch screen assemblies further have electrodes positioned about the periphery, with these electrodes being more electrically conductive than the resistive surfaces. In order to avoid anomalies in the electrical output, frequently referred to as "bowing", the electrodes may have configurations which are arcuately formed in order to linearize the output and eliminate or reduce signal anomalies. In use, the surface of the coverlay film may be touched by any object exerting pressure against the surface, such as by means of an operator's finger, a stylus, or by other suitable means, thereby creating a combination of electrical signals at the peripheral electrodes which are unique to the specific location of the applied pressure. Typically, the X-Y coordinates may be determined by evaluating the output signals obtained from the electrically resistive coatings forming part of the system.

In the processing steps and in a number of typical applications, it is desired that the touch screen substrates have limited or low reflectivity. Surface reflection is ordinarily determined as a function of the surface properties of the substrate and coverlay film, with the optical properties of the coverlay typically being more predictable and more easily controlled than those of the substrate. The process of the present invention enhances the properties of the substrate.

SUMMARY OF THE INVENTION

The present invention comprises a process for preparing improved touch screen or touch panel devices with desirable optical and electrical properties. Among the features which result in the improved properties are the utilization of a highly desirable photoresist along with improved processing techniques. In particular, the preferred substrate material is glass, with glass substrates suitable for this application being commercially available. The selected photoresist is one which can be laminated under heat and pressure to become adherently bonded to the substrate surface, with the photoresist, as applied during the process, having and utilizing a release film backing component. This technique enables and facilitates the creation of a highly adherent layer of photoresist which is uniform in its consistency and photoresponse, as well as in its final overall thickness. In order to prepare the substrate, it is pre-baked prior to application of the photoresist layer, with this step being undertaken in order to pre-heat the substrate to better facilitate the laminating step which is next in the operation. It has been found that this step improves the quality, uniformity, and durability of the finished product. Photoresist is attached or applied as a layer to the heated glass substrate to create a laminate pre-form. In the laminating operation, heated air-actuated rubber nip rolls are utilized in order to create a uniform and desirable laminate. The photoresist layer of the laminate is then masked and moved to a UV exposure station where the photoresist is exposed, with the exposed laminate thereafter being moved to a developing staging and/or developer station. Following the develop operation, the resist coating is converted to the pattern of mechanically durable reticulated projections, with the laminate then being moved to a wash/dry station where bonding adhesives are applied to the substrate edges. Thereafter perimeter electrodes and the flexible plastic film are bonded to the treated surface of the substrate and the touch screen is complete.

In the individual steps included in the process or operation, it has been found that:
(a) The substrate pre-bake operation effectively pre-heats the substrate so as to provide a better bond between the surface of the substrate and the photoresist layer;
(b) The photoresist layer more readily flows when subjected to the nip rolls in the laminator station;
(c) The utilization of heated rolls in the laminator operation further enhances the bonding and flow characteristics of the photoresist layer, thereby enhancing the durability and uniformity of the finished product.

Thus, the steps of substrate pre-heating, the use of heated nip rolls, and the use of a photoresist layer with a backing film are all instrumental in the enhancement of the overall optical, electrical and mechanical properties of the finished touch screen or panel component.

Therefore, it is a primary object of the present invention to provide an improved process for the preparation of touch screen assemblies, with the improved process of the present invention resulting in touch screens which exhibit enhanced optical, electrical and mechanical characteristics, including a significant enhancement of lifetime and a reduction in surface reflectivity from the substrate.

It is a further object of the present invention to provide an improved touch screen which is produced by a series of operations or steps in a process in order to create a uniform pattern of reticulated spaced projections with rugged mechanical properties, and which are of a uniform height, the projections being utilized as spacer elements between opposed electrically resistive coatings.

Other and further objects of the present invention will become apparent to those skilled in the art upon a study of the following specification, appended claims and accompanying drawings.

IN THE DRAWINGS

FIG. 1 is a flow chart deriving a series of steps involved in the creation of a dot placement pattern for touch screens, with the individual steps being set forth; and FIG. 2 is a perspective view, partially in section and partially broken away, illustrating a typical touch screen prepared in accordance with the present invention.

DESCRIPTION OF THE PREFERRED EMBODIMENT

In the processing of touch screens in accordance with the preferred embodiment of the present invention, the steps involved in the initial preparation of the coating on the substrate are known, with the more desirable resistive coatings consisting of a semiconducting metal oxide such as indium-tin oxide, tin oxide, tin antimony oxide, or indium oxide. Commercially coated substrates are available commercially from a variety of sources including the Donnelly Company of Holland, Mich. In connection with the present process, the appropriate substrate is glass.

By way of further explanation, touch screens and the method of preparing the individual components is set forth in detail in Barrett et al U.S. Pat. No. 5,736,688 entitled "Curvilinear Linearization Device For Touch Systems", Apr. 7, 1998, the disclosure of which is hereby incorporated by reference.

With attention now being directed to the flow chart of FIG. 1, the glass substrate having a electrically resistive coating thereon is selected and inspected for optical clarity and uniformity of resistivity, with the process as described in Example 1 being utilized for dot placement and coverlay lamination.

EXAMPLE 1

Following selection and inspection of the glass substrate the substrater is pre-baked to a temperature of 170° F. and a film-backed photoresist is then applied as a layer on the substrate surface. The physical properties of the resist are such that it adheres well to the resistive coating following pre-bake. Although such resists are commercially available, one preferred resist is identified by the trade designation "Laminar Aqueous Resist", from Shipley Ronal Company of Scottsdale, Ariz.

Following placement of the-photoresist layer onto the heated glass substrate, the combination is then passed through a laminator where the combination is subjected to a series of heated air-actuated rubber rollers, with the rubber rollers being at a temperature of about 235° F. Following the laminating operation, the exit temperature of the composite is preferably at about 140° F.

By way of suitable ranges, the pre-heat oven is preferably held at a temperature above about 200° F., or otherwise at a suitable temperature enabling the substrate to exit the oven at a temperature of about 170° F. While nip roller temperatures of about 235° F. are preferred, temperatures within the range of 220–250° F. may be employed. Also, while the exit temperature is preferably about 140° F., suitable exit temperatures range from between about 110° F. and 145° F.

Following the attachment of the photoresist layer to the glass, an appropriate mask is laid down on the surface of the resist. The combination is then ready for the exposure step.

The UV or radiant energy source is preferably an "ORC", commercially available from ORC Company of Japan. UV exposure is undertaken utilizing a light source with a significant portion of radiant energy being in the ultraviolet range and below about 400 nanometers. Exposure is undertaken at a distance of 18 inches (or 46 cm.) from the source and maintained for a period of about 38 units. Following exposure, the mask and liner are removed and the exposed photoresist is passed to the develop stage. An exposure "unit" is typically measured as 0.35 seconds, thereby providing an exposure period of approximately 11 seconds.

The developer solution consists primarily of potassium carbonate, with such solutions being commercially available, and one such material being "Resolve™211" available from Shipley Ronal Company of Scottsdale, Ariz. Other developers are, of course, suitable and may be utilized as appropriate. Upon completion of the develop step, the projections are formed and the completed plate is washed and dried and rendered ready to receive the electrode tails.

Application of electrode tails is a process known to those of conventional skill in the art, and appropriate complementary tails are applied to both of the electrically resistive surfaces. Appropriate selection is made for resistive analog devices of either 4 or 5 wire design.

The substrate and coverlay assemblies are then delivered to the adhesive application station where appropriate adhesives are applied to the glass for bonding of the coverlay thereto. The coverlay is preferably one prepared from a polyester such as polyethylene terephthalate, with one stress oriented polyethylene terephthalate being commercially available under the mark "Mylar" from E.I. Dupont de Nemours Corp. of Bloomington, Del., with the coverlay having an electrically conductive film of appropriate resistivity thereon. Resistivity is selected for the application and is known to thoses of skill. Also, such films are commercially available. Thereafter, the coated Mylar is applied to the glass and bonded into place, with the touch screen assembly operations then being complete.

With attention now being directed to FIG. 2 of the drawings, it will be observed that the touch screen or panel 10 comprises a substrate 11 upon which there is positioned a reticulated pattern of individual projections 12—12. Superimposed over these projections is a polyethylene terephthalate film 13, the inner surface of which carries an electrically resistive film. While not shown in the drawings, it will be appreciated that individual electrodes are present adjacent the periphery in order to establish the field for creating electrical signals indicative of the X-Y location of application of touch.

It will be appreciated, therefore, that the above-detailed operations result in the preparation and formation of touch screens having highly desired optical and electrical characteristics, with the spacer/projections being highly adherent to the substrate and uniform in both reticulated pattern and height. It will be further appreciated that the above examples are presented for illustration purposes only and are not to be construed as a limitation upon the scope of the claims to which this invention may be otherwise entitled.

What is claimed is:

1. In a contact input system; a touch screen assembly for determining the coordinates of contact pressure, with said touch screen assembly including a base substrate with inner and outer major surfaces, and with an electrically resistive coating and an array of reticulated spaced raised projections on said inner surface, a flexible plastic film secured to said substrate and superimposed upon said resistive coating and raised projections, with said flexible plastic film-having an electrically resistive coating on the inner surface in opposed relationship to said resistive coating and raised projections, and electrodes configured adjacent the perimeters of said electrically resistive coatings for creating generally orthogonal electrical fields and for detecting electrical signals created upon application of contact pressure to said flexible plastic film, said array of reticulated spaced raised projections being formed on said inner surface of said base substrate by developing a photoresist layer partially exposed to radiant energy, said photoresist layer being previously laminated to said base substrate under pressure applied by heated rollers, wherein said base substrate is heated to a temperature greater than about 110° F. prior to lamination of said photoresist layer thereto, said raised projections being characterized in that:

(a) each projection in said array being:
      (i) configured as a regular cylindrical projection of a certain uniform height and width; and
      (ii) uniformly spaced from its neighbor along regular X-Y coordinates.

2. The touch screen assembly of claim 1 wherein said developed photoresist is formed while said substrate is heated to a temperature of between about 110 and 130° F.

* * * * *